United States Patent [19]

Greenfield et al.

[11] 4,013,516
[45] Mar. 22, 1977

[54] APPARATUS AND PROCESS FOR THE PYROLYSIS OF WASTE SOLIDS CONCENTRATES

[75] Inventors: Charles Greenfield, Murray Hill; Robert E. Casparian, Boonton; Anthony J. Bonanno, Parsippany, all of N.J.

[73] Assignee: Hanover Research Corporation, East Hanover, N.J.

[22] Filed: Mar. 13, 1975

[21] Appl. No.: 558,080

[52] U.S. Cl. ............... 201/2.5; 201/25; 203/7; 203/47; 159/1 RW; 159/DIG. 25; 210/71

[51] Int. Cl.² .......... C10B 43/00; C10B 51/00; B01D 3/34; B01D 1/00

[58] Field of Search ........... 201/2.5, 25; 48/209; 159/17 VS, 1 RW; 252/410; 162/30; 210/71; 203/47

[56] References Cited

UNITED STATES PATENTS

| | | | |
|---|---|---|---|
| 2,056,746 | 10/1936 | Strupp | 159/17 VS |
| 2,337,684 | 12/1943 | Scheineman | 159/DIG. 3 |
| 2,339,932 | 1/1944 | Kuhl | 159/DIG. 3 |
| 2,573,906 | 11/1951 | Huff | 201/2.5 |
| 2,676,908 | 4/1954 | Noel | 201/2.5 |
| 3,275,547 | 9/1966 | Bucksteeg et al. | 201/2.5 |
| 3,304,991 | 2/1967 | Greenfield | 159/1 RW |
| 3,309,262 | 3/1967 | Copeland et al. | 159/DIG. 3 |
| 3,718,446 | 2/1973 | Brink et al. | 201/2.5 |
| 3,862,909 | 1/1975 | Copeland | 201/2.5 |

*Primary Examiner*—Jack Sofer
*Attorney, Agent, or Firm*—Richard L. Cannaday; William J. Ungvarsky; Robert T. Tobin

[57] ABSTRACT

Apparatus and a proccess for the thermal decomposition of organic material is disclosed wherein the waste solids concentrates are first mixed in a fluidizing tank with a fluidizing oil to form an appropriate mixture which is then dehydrated to remove water from the waste and oil mixture. Subsequently, the waste solids and oil are separated. The resultant dehydrated, substantially oil free organic waste material is then pyrolized within a temperature range of approximately 700° F. to 1800° F. by which lower molecular weight organic compounds are distilled off as organic vapors and gases while a residue of char and ash remain.

26 Claims, 2 Drawing Figures

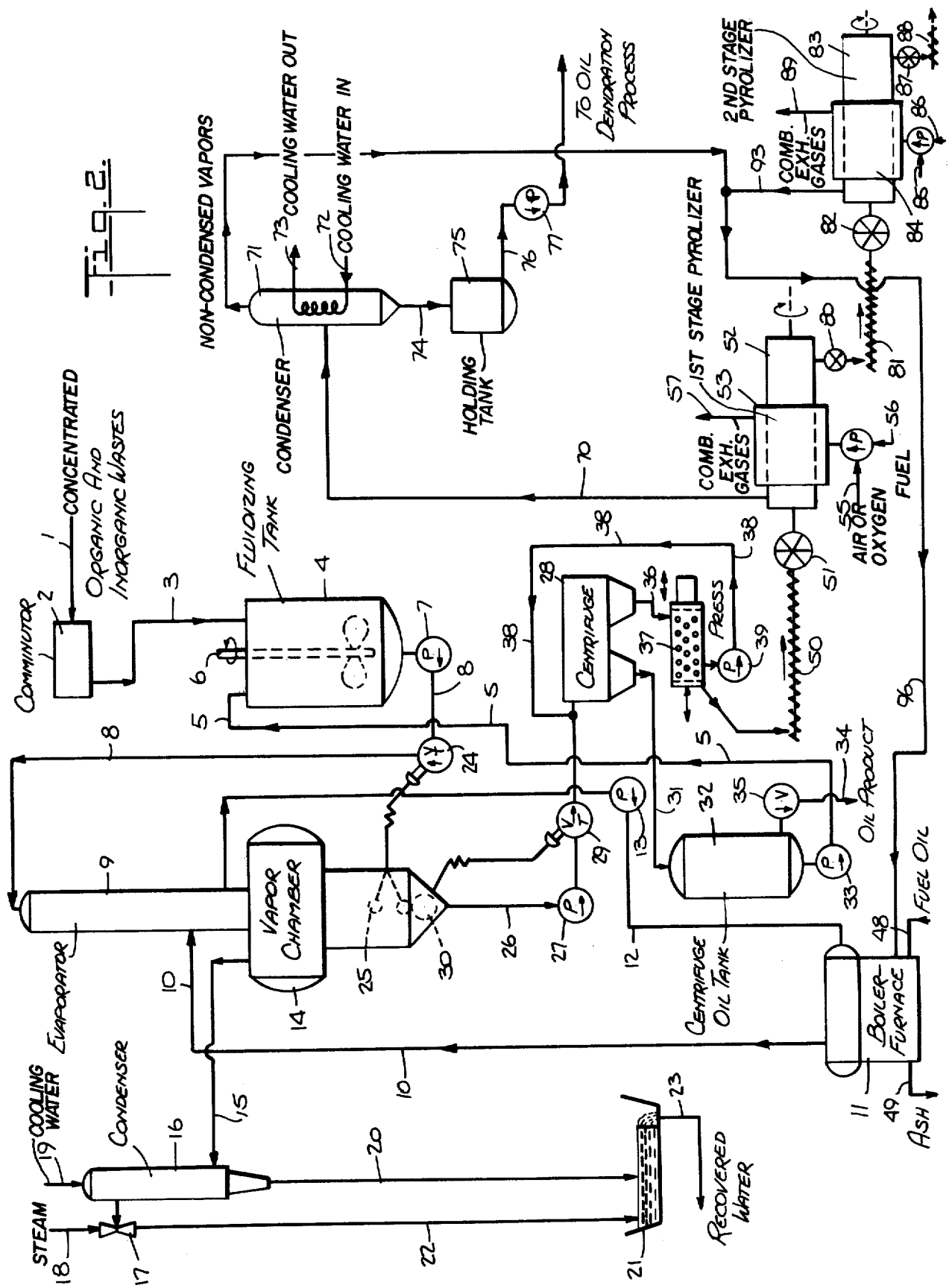

APPARATUS AND PROCESS FOR THE PYROLYSIS OF WASTE SOLIDS CONCENTRATES

BACKGROUND OF THE INVENTION

1. Field of the Invention

This invention relates to improved apparatus and a process for the pyrolysis of dehydrated waste solids concentrates. More particularly, it relates to improved apparatus and a process for the thermal decomposition of organic material comprising essentially the following process steps: admixing oil to the waste solids, heat evaporating off substantially all the water content of the organic material, de-oiling the resulting, dehydrated organic material, and pyrolizing or destructively distilling this material to produce distillable lower molecular weight organic compounds, char and ash.

2. Description of the Prior Art

The efficient economic disposal of waste solids concentrates is a recognized problem. Particularly in recent years because of increased emphasis on environmental impact problems associated with air and water pollution, land contamination and disposal problems, the necessity of developing disposal apparatus and processes which are economically efficient and relatively pollution free has become increasingly important. Furthermore, such processes should also obtain valuable by-products, or alternatively, recycle materials through the process to improve their efficiency.

The prior art processes, however, have not solved these pressing problems but rather usually involve some form of settling, aeration, chemical treatment or thermal decomposition of the organic material. Each of these processes produce unwanted discharges into the atmosphere or the earth or are very time consuming. For example, in the customary prior art process for raw sewage it is first treated by settling, aeration, and chemicals to generate a stream of water sufficiently clean to be discharged into a river or stream with a residue of sewage sludge discharge into a closed tank called a digester. The digester must be of sufficient volume to permit a dwell-time of 30 days or longer. Heating means such as hot water coils are provided in the digester, and the sludge is maintained at an elevated temperature to provide anaerobic bacterial digestion of the organic constituents which break down the solids in part into gaseous material. The gaseous material may have a substantial content of methane and thus be drawn off continuously to be burned as a fuel for heating the water circulated through the digester coils. Sewage solids in a stream which may have a water content of about 95 percent are drawn off from the digester and spread out in large drying beds for final evaporative drying. The resulting dry solids may be incinerated or disposed of to farms for fertilizer and other possible uses.

If instead of the evaporative drying process the organic waste are burned or thermally decomposed within a furnace and oxygen or air be used, great volumes of gases may be produced which are then discharged as an air stream into the atmosphere. Additionally, solid particulate matter may be discharged into the atmosphere as suspended particles within the air stream.

Further the prior art processes generally suffer from an inability to utilize the products or the energy produced within the process to efficiently carry out the process and reduce the energy required for the process.

It is therefore an object of this invention to operate the apparatus and processes of this invention so that the energy requirements of the process are kept to a minimum while at least a portion thereof is produced by the process itself.

It is a further object of this invention to operate the apparatus and processes of this invention so that the end products of the process are held to a minimum but produced in a useful form.

It is a further object of this invention to operate the apparatus and processes to be environmentally efficient and produce a negligible discharge of pollutants into the atmosphere or environment in general.

It is a further object of this invention to operate the apparatus and process of this invention in a manner which avoids the necessity of obtaining special equipment subject to contamination and deterioration by the process conditions and the products thereof.

SUMMARY OF THE INVENTION

These and other objectives are achieved according to this invention by utilizing apparatus and processes by which oil is admixed to the waste solids, which are then substantially dehydrated and subsequently de-oiled. The resulting concentrate is then pyrolized or destructively distilled to produce ash and char and various forms of organic vapors and gases. The latter may be recycled and used as fuel for the dehydration equipment or the de-oiling step.

In contrast, if the material were thermally destroyed in a process in which oxygen or air is used, great volumes of gases would be produced. If, however, the organic material be decomposed by pyrolysis or destructive distillation in which the thermal decomposition occurs in the absence of oxygen, or an insubstantial quantity of oxygen or air, the generally non-distillable organic material may be converted to distillable, lower molecular weight compounds. Further, if the waste solids are pyrolized, the apparatus employed produces exceptionally low vapor velocities and avoids the problem of suspended particulates, such as inorganic solids, in the distillate or gaseous stream. This factor may be very important in avoiding air borne pollution problems.

If the material to be pyrolized be dehydrated or essentially moisture-free, there is not only a lowering of the production of gases and vapor velocities upon the heating of the material in the pyrolizer, but there is also a reduction in the possibility of corrosion in the pyrolizer unit in comparison to treating the material in a wet state. Further, scaling of the pyrolizer heat transfer surfaces may be reduced as well as a reduction achieved in the amount of energy required to evaporate the free moisture.

In carrying out these objectives in accordance with this invention, a subtantially moisture-free solid suspended in an oil medium is produced by the oil dehydration process described, for example, in U.S. Pat. No. Re. 26,352. That process uses an evaporator unit, operated by mixing an input material with an oil to obtain a mixture of wastes solids containing water and oil. The water content in the mixture is heat evaporated off and a resultant concentrated, substantially anhydrous slurry of input material an oil is produced. After the material leaves the evaporator system substantially all the oil is separated from the solids by centrifuging, pressing or other suitable extraction techniques. The solids produced by this evaporation step may then be pyrolized to produce fuel vapors which may then be burned in a standard boiler-furnace to produce steam. Because of the combination of dehydration and pyrolysis which produce combustible end products essentially free of non-combustible particulates, it is not usually necessary to remove significant amount of particulate matter from the boiler-furnace.

If the usual thermal decomposition with air or oxygen and a solids-handling boiler is used, one encounters problems in handling the particulate material produced. Expensive, custom designed and field constructed boilers are often required to permit recovery and convenient handling of the ash produced.

Another problem frequently encountered when pyrolization is not employed is in the treatment of material containing salts. In that instance the salts present in the feed material may produce slagging of the boiler tubes and other areas of the boiler. To avoid this problem in normal operations, more elaborate boilers capable of handling slagging salts are used, for example, in the paper industry involving the use of the so-called Kraft black liquor chemical recovery furnace. These units are not only exceptionally expensive but are also subject to violent explosions if water be present in the slag. Slagging which occurs at the elevated temperatures normally used in the boiler furnace is eliminated by means of a pyrolizer operating below slagging temperatures.

One simplified example of combining the oil dehydration process with pyrolysis is to heat the dried solid material suspended in oil (usually fuel oil) as it leaves the evaporator. Usually this is accomplished by using indirect hot gases or direct radiant heat which result in raising the temperature of the mass. The residual oil is thoroughly decomposed and vaporized from the dehydrated oil-free organic solids, leaving a residue of char and ash, both of which can be utilized in a variety of ways as explained below. "Char" is defined as organic material that is not completely decomposed at the time and temperature of operation of the pyrolizing unit and is sometimes called "fixed carbon."

If the material leaves the evaporator as a fluid slurry, it is first separated into oil and solids containing residual oil. This separation is usually accomplished by a centrifuge, although gravity, screening, filtration, pressing, and other suitable methods of separation may be used. The solids phase containing residual oil is then pyrolized into the residual oil vapors, pyrolized organic vapors (organic material whose condensation temperature is above that of water), organic gases (thermally decomposed organics of low molecular weight whose condensing temperature are below that of water), and a residue of char and ash.

If desired, the residual oil on the separated solids may be predominantly removed by extraction and other appropriate techniques. The solids containing organic matter may then be pyrolized to produce vapors and gaseous products and a residue of char and ash.

In most cases the vapors and gaseous products produced may be burned in the boiler-furnace to produce steam to operate the evaporation system. Any excess gaseous products may be used to generate power or other uses particularly if the vapor and gaseous products exceed the energy required to operate the dehydration system. Examples of such use might be to produce high pressure steam for power generation to operate the rotating equipment of the oil drying and pyrolysis process. Steam at reduced pressure can be used to operate the evaporator dehydration system.

The heat required for the pyrolysis of the dry solids is relatively small because of the low specific heat of the solids and because the heat of vaporization of the oil and decomposed substances is also low. A separate heat source may be used to provide the necessary heat required for this operation with the energy required supplied in counter current flow to the flow of material within the pyrolizer unit. An alternative may be to use the combustion gases generated from the pyrolization vapors to provide part of the heat needed. In any case, comparatively little additional heat is required for materials pyrolized in the dry state. The heat of vaporized fuel oil and the decomposed organic matter is quite low, averaging about 125–150 BTU per pound. This heat can be recovered in the boiler furnace which is at a higher energy level than when the fuel oil is in the liquified state and because the combustion is most efficient in the vaporized state.

If it be desirable to store the produced fuel, a surface condenser can be placed in the vapor discharge line of the pyrolizer to condense the vaporized fuel oil generated as part of the vapors from the pyrolizer if the pyrolizer is run at temperatures not exceeding about 1000° F. and within a sufficiently limited time. In this manner a surplus of fuel can be maintained in the processing plant for other additional uses. Any energy evolved in condensing the fuel vapors can be utilized to preheat the aqueous feed material of the evaporator or for other heat requirements as they arise. It is, however, generally preferred in order to gain the maximum energy recovery to utilize the pyrolized gases and vapors as fuel in the form produced.

In those cases where sufficient energy is available in the original aqueous waste solids to run the evaporator and other units it may be desirable to run the pyrolizing unit in two stages with the vaporized oil removed in the first stage. In this example it is desirable that the fluidizing oil fraction have an approximate boiling range of 350° F. to 700° F., with the most preferred range between 350° F. and 500° F. If these criteria are met, the fluidizing oil may be recovered in its original form in the first stage of a two-stage pyrolysis unit by thermally distilling the oil. After condensing, the vaporized fuel oil can be used to preheat the feed or provide other heating requirements of the process. The second stage of pyrolysis may then be used to vaporize any remaining oil present and decompose the oil-free organic solids as described previously. If during the first stage of pyrolysis some of the solids decompose to produce an aqueous phase of material having a substantially high biological or chemical oxygen demand material, these components will, on condensing, be separated from the oil phase, and the oil may then be used for fluidizing. If required, some additional water may be used to wash out these contaminants from the fluidizing oil to reduce distillable water soluble organics. In either case the organic-rich water phase may be separately purified by carbon treatment or by other well-known means or burned directly in the boiler-furnace.

In some cases it is advantageous to vaporize all the oil directly from the slurry of oil and solids leaving the evaporator. This can be particularly valuable if one desires to crack the higher residual materials into carbon and lower molecular weight oil bodies as might be practiced in the petroleum industry where waste oil, water-solid emulsions are problems. Such emulsions can be combined with activated sludges and air floatation concentrates and dehydrated by the dehydration process to yield a light oil fraction from the evaporator distillate. The heavy oil and dry waste solids containing clays and catalysts may then be pyrolized to produce a residue of char and ash and a distillate of cracked oils, which in turn, if desired, may be further processed to up-grade the stock. In another aspect of the present invention the heavier oils may be centrifuged and purified and the residue may then be pyrolized to produce lesser amounts of cracked oils, char and ash. In a similar fashion crank case oils can be blended with the oil-water emulsions or other wet materials and dehydrated and pyrolized to leave behind most of the impurities such as lead.

The char and ash produced by the inventive process may by valuable by-products useful in many ways. For example, dye wastes containing organics and salts of various types, predominantly sodium chloride and sodium sulfate, may first be evaporated in an oil-drying multi-effect evaporator system from a low concentrate of total solids, i.e. 2 to 4%. The multi-effect drying system using oil results in a dry slurry of salts and organic dye wastes suspended in fuel oil. Either No. 2 or No. 4 fuel oil may be used depending on costs or the amount of added carbon desired. No. 4 fuel oil often contains a higher percentage of No. 6 oil, which may contain 5% or more carbon residue after pyrolysis. The dried solids suspended in oil are passed through a centrifuge leaving about 20% oil content on the dry solids. The material is then pyrolized in the absence of oxygen and heated to about 1000° F. Vapors from the organic dyes and oil are distilled and are discharged to a package-type boiler-furnace producing steam for operating the dehydration-evaporator system. The organic dry waste solids total about 200 lbs/hr. whereas the inorganic salts amount to about 1,000 lbs/hr. The water may be removed by the use of oil drying process at a rate of 40,000 lbs./hr. in a previous quadruple-effect evaporation step. The oil remaining as part of the dried solids is pyrolized to produce vapors to supply a portion of the heat required to run the evaporator system. In addition to this distilled oil, the pyrolysis of the organic dye waste solids, when thermally decomposed into their vapors and gases, may also be used to supply a portion of the heat required to run the evaporator system. Additional fuel may be required beyond that described to supply the total evaporation heat for the multi-effect evaporation system.

The pyrolizer also discharges a char and inorganic salts which are washed with a controlled quantity of water to form an under-saturated solution of soluble salts such as sodium chloride and sodium sulfate. This salt solution may then be reevaporated as one effect in the multi-effect oil drying evaporator. Since there are no scaling compounds present, no oil need be added to this step and the concentration of the salt mixture can be carried forward to produce a crystallized salt in a standard evaporator unit. These salts may be recycled and used again in the dye manufacturing industry. In order to insure that no insoluble inorganics are present, the solution is filtered preferably through activated carbon which has been derived from carbon present in the char formed in the pyrolysis step which also removes the greater part of the soluble heavy metals. The carbon and insoluble salts can then be dried in the evaporator system and the mixture used for road tar aggregate. In the event the residual inorganic salts contain valuable insoluble heavy metals these can be recovered by combustion in the carbon and recovering the fuel values of the carbon.

The techniques described illustrate the inter-relationship between the pyrolysis system and the possibility of recovering many products and fuel values otherwise difficult to handle and only obtained at substantially higher operating costs.

Sewage sludge from municipalities or industries also may be dried by the dehydration process and thereafter the slurry of dried solids and oil centrifuged to produce a solid material containing 30 to 40% oil and/or fat. In the multi-effect evaporation system the steam requirements for evaporation may be generated from the solids containing aproximately 15 to 20% fat or oil. Thus, the excess oil can be used back in the fluidizing system as described below.

The first stage of pyrolysis is used to thermally distill off the excess oils on the dry solids that are not required for generating energy for the evaporation process and often include power genration. After condensing, this distilled oil is used as part of the fluidizing oil. The second stage of pyrolysis produces the oil vapors and gas for supplying the total energy required for the dehydration operation, and all auxiliary systems.

If the oils produced in the first stage of pyrolysis contain a chemical or biological oxygen demand, distillable water soluble fraction, then this fraction may be either water washed out of the oil phase or separated at a water layer. This water phase can be treated with carbon or burned in the boiler-furnace.

The energy required for the pyrolysis step to thermally heat the dry organic solids and oils represents a small portion of the energy required for the dehydration and auiliary systems. The resultant inorganic ash which is essentially insoluble material, combined with the carbon material, can be used as a filler in road surface material.

An alternate procedure, when it is desired to recover all the energy, is to burn the char left in the pyrolized residue. This can be accomplished at temperatures in the range of approximately 1200° F. to 2200° F. by the use of steam and controlled quantities of air to supply heat to the endothermic reaction of steam and carbon and produce fuel gases therefrom. The fuel gases are then combined with the vapors and fuel gas originally produced. The apparatus for accomplishing this result is similar to the pyrolysis equipment described.

Another important attribute of the process is its ability to produce activated carbon as a by-product. The activated carbon can then be used to remove any biological or chemical oxygen demand from the distillate or other waste waters amenable to carbon treatment. For example, the evaporative condensate from pharmaceutical waste water may contain organic acids, and the evaporative condensate from sewage sludge usually has volatile organics which can often be removed by carbon treatment. The material is absorbed in wet form on carbon and may then be recycled back through the process where it is dried and then pyrolized to burn off the absorbed organics. Although some of the chemical and biological oxygen demand may be redistilled, this distillate may be readily isolated in a highly concentrated form and added to the fuel gases for combustion.

The pyrolysis temperature is in the range from 700° F. to 2200° F. with the preferred range from 800° F. to 1800° F. The raw materials or wastes used in the dehydration process may have any moisture-containing material which has an organic or inorganic content in any quantity that poses a pollution problem or makes it desirable to recover fuel or residual products such as char and inorganic materials.

Other examples utilizing the process are:

Filter Aid Recovery 13 wet filter aids often contaminated with substantial quantities of organics can be dried in a multi-effect evaporator system by the process. Thereafter, after centrifuging the bulk of the fluidizing oil, the material is pyrolized and the oil and organics are converted to fuel vapors and gases in large part. If the pyrolysis step be carried out at temperatures in the range 1200° F. to 1400° F. or below the fusion point of the filter aid, a reusable filter aid may be obtained. The inorganic filter aid material is mixed with char and can be used as such or a steam and air mixture then can be applied to the inorganic char residue to produce an inorganic material while producing additional fuel gases. If any agglomeration has occurred, the filter aid can be ground to a finer particle to restore most of the original filter properties. Soluble inorganic impurities can be washed out when it is reused.

In a similar fashion to handling filter aid material spent wet catalysts can be upgraded by this technique.

Coal fines such as those products not amenable to centrifugation to reduce the water content may be dried in a multi-effect oil drying evaporator and dry coal fines containing oil may be pyrolized to produce fuel vapor, gas, char and ash. This is a valuable resource which has not been economically utilized.

Black liquor of the Kraft pulp industry contains lignins and pulping chemical salts which are normally recycled. The lignins and other organics in the old art are burned in the wet state along with the salts. This requires elaborate furnaces. In contrast, this process dehydrates the black liquor essentially to 99% dryness using multi-effect evaporation, saving energy over the older techniques. The material is then centrifuged to reduce the oil content and thereafter pyrolized to convert the lignin and other organic matters to fuel vapors and gases. Salts and char are the residual products which may then be treated with water to produce the aqueous phase of inorganic salts solution used in the Kraft Pulp Process. The residual carbon when activated in the char can then be utilized to clean waste waters in the pulp paper producing industry. The wet carbon containing the absorbed organics can be redried in any dehydration system and used as fuel.

Refuse and garbage dehydrated by the dehydration process and then pyrolized has the added economic advantage of multi-effect evaporation and therefore more energy utilization than the older techniques.

The oils utilized are essentially, but not limited to, fuel oils such as No. 2, No. 4, and No. 6, crank case oil or any combination of oily materials that are waste organics having boiling point ranges between 300° F. and 1000° F. or higher or products that can be cracked or decomposed into lower molecular weight compounds to produce oils for the fluidizing, dehydration process and/or used for fuel vapor and gas production. These materials should essentially have the property of being oil-like and may often be utilized as a fluidizing agent. It may include animal and vegetable fats and derivatives, and other oils or oil-like materials where it is more profitable to obtain fuel values rather than recovery of products.

BRIEF DESCRIPTION OF THE DRAWINGS

The nature and substance of the present invention as well as its objects and advantages will be more clearly perceived and fully understood by referring to the following description and claims taken in conjunction with the accompanying drawings of the invention applied to the treatment of organic wastes in which:

FIG. 2 represents a flow diagram of the invention utilizing a two-stage pyrolizer.

DESCRIPTION OF THE PREFERRED EMBODIMENT

Figure 1:
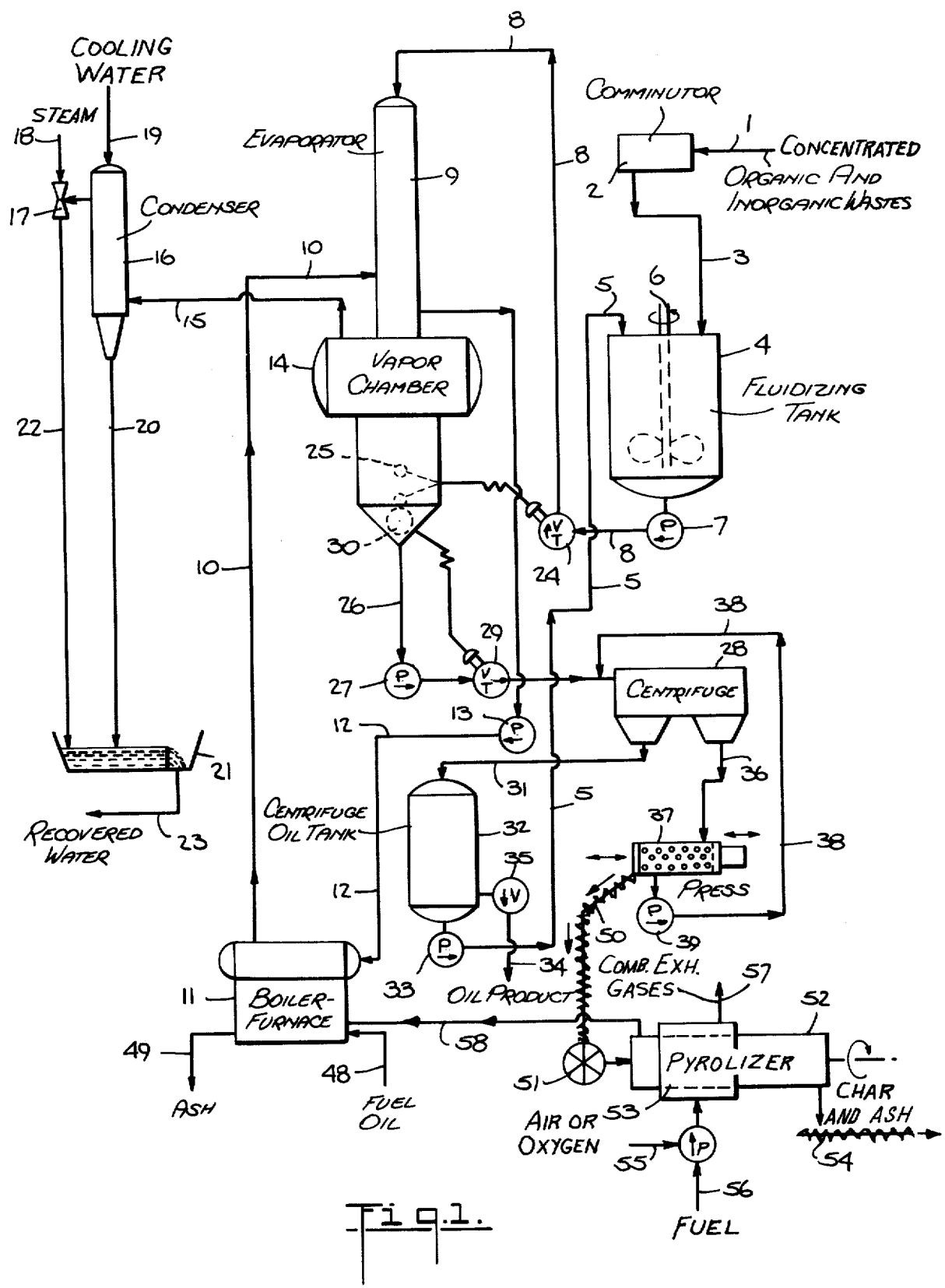
FIG. 1 represents a flow diagram of the invention utilizing a one-stage pyrolizer.

Referring particularly to the flow diagram shown in FIG. 1, concentrated organic and inorganic wastes enter grinder or comminutor 2 through line 1. From comminutor 2 the wastes, containing solid particles of a limited maximum size, flow into fluidizing tank 4 through line 3. Hot oil or fat is added through line 5 to tank 4 to maintain a pumpable fluid solids system or mixture even after the evaporation of the water content therefrom. The system is mixed and agitated in fluidizing tank 4 by means of stirring device 6, and then withdrawn from the tank by means of pump 7.

The pump delivers the mixture of organic wastes and admixed oil through line 8 to the top of a single-stage or single-effect evaporator 9 which may be of the falling film type, for example, and which is supplied with steam through the line 10 from boiler-furnace 11. This steam may have a temperature in the range of 240° F. to 270° F. After the steam has been condensed to water, it leaves the evaporator through line 12 to return to the boiler-furnace, being picked up and driven by boiler feed pump 13. Within the evaporator 9, water is boiled off of the wastes and oil mixture at a pressure which may be in the range 4 in. Hg Abs. (inches mercury absolute) to 12 in. Hg Abs. This water from the wastes and oil mixture leaves vapor chamber 14 of the evaporator in the form of super-heated vapor, passes through line 15 and flows into barometric condenser 16 (preferably a surface condenser) within which a vacuum is maintained by means of ejector 17 (preferably a mechanical vacuum pump) supplied with steam through line 18.

Super heated vapor entering condenser 16 through line 15 is mixed with, and is condensed by cooling water entering the condenser through line 19. The resulting stream of rather warm water is discharged through line 20 into hot well 21. The hot well also receives the steam and non-condensable gases leaving ejector 17 through line 22, and the water in the well serves to condense this steam with the non-condensables escaping at and from the water surface. Water is drawn off continuously through line 23 from the hot well itself and may be reused through the wastes treatment plant. In an alternate arrangement, the steam and non-condensables leaving ejector 17 could be sent to the fuel oil nozzles or firing apparatus of boiler furnace 11 and used to atomize the liquid fuel. The non-condensables, often odoriferous and being at least partly of flammable nature, would themselves provide heating value as they participated in the furnace combustion.

Flow of the wet slurry or mixture of organic wastes and oil to the evaporator is controlled directly by throttle valve 24 in line 8 on the discharge side of pump 7. The opening of this valve is controlled in turn by liquid level sensing device 25 in the sump of the evaporator, this device sensing the level of the surfaces of the essentially fully dehydrated slurry or mixture of organic waste solids and oil therein. An excessively high level causes the valve to close at least part way with consequent reduction in flow of wet slurry to the evaporator, while an excessively low level causes the valve to open wider with consequent increase in flow.

Dry slurry is withdrawn continuously from the bottom of the evaporator through line 26 by means of pump 27, and is discharged thereby to centrifuge 28. Flow of the dry slurry or mixture of organic waste solids, oil, and trace quantities of water to the centrifuge is controlled directly by throttle valve 29 in line 26 on the discharge side of pump 27. The opening of this valve is controlled in turn by moisture sensing device 30 in the sump of the evaporator. At least an excessively high moisture content of the slurry in the evaporator sump causes this valve to close part way with consequent reduction of flow of dry or dehydrated slurry from the evaporator. Normal composition of dry slurry leaving the evaporator through line 26 would be about 1% water, approximately 15% non-fat solids, and the remainder liquid fat or oil.

Centrifuge 28 separates the dehydrated organic waste solids and oil slurry into two streams. One of these streams, a stream of relatively clear oil, is discharged and delivered through line 31 to centrifuge oil tank 32. This oil is recycled or circulated back from tank 32 to fluidizing tank 4 through line 5 by means of pump 33. Should the system generate oil in excess of that needed for fluidizing purposes, this excess or net product oil may be withdrawn from tank 32 through line 34 provided with stop valve 35. The other stream from the centrifuge, a stream containing substantially all of the organic waste solids but which is still about 30% to 40% oil by weight, is discharged and delivered through line 36 to a mechanical pressing apparatus 37 of a kind constructed and configured to effect substantially separation of the liquid and solid components of a liquids-solids mixture, the nature of a reciprocating press or liquid-solid separator, for example, a piston-type, perforated barrel or curb or cage press such as that disclosed in U.S. Pat. No. 1,135,309 issued to E. T. Meakin on Apr. 13, 1915. It may indeed be a press of this nature, but it may also be a press of any other suitable kind. In the general sense, of course, centrifuge 28 itself may be regarded as a liquid-solid separating press, one in which pressures or separating forces are generated dynamically rather than statically. It is within the comtemplation of the present invention that certain waste solids concentrates amenable to processing in accordance with it will yield dry slurries at the evaporator sump discharge which can be separated economically and adequately into their non-fat solids and liquid oil components by means of a single piece of mechanical equipment only, that is, for example, by either a centrifuge alone or a perforated barrel press alone.

Two streams of material leave press 37, possibly intermittently depending upon the nature of the press. One of these, a stream of oil withdrawn from the press through line 38 by means of pump 39, represents the oil pressed out of the stream of essentially water-free but still oil-containing material delivered to the press through line 36 from centrifuge 28. As shown, line 38 connects into line 26 so that oil flowing through line 38 mixes with and further fluidizes the dry slurry of oil and organic waste solids flowing from the evaporator to the centrifuge. This is not the only way in which oil from the press can be handled. Such oil may, for instance, be sent directly to centrifuge oil tank 32 for prompt recycling to fluidizing tank 4.

Assuming that the organic wastes are originally oil-containing, the vigor of the operation performed in and by press 37 will determine whether or not the system generates a net oil product which can be withdrawn through line 34 or otherwise. Pressing down to just a "break even" level of residual oil in the organic waste solids will allow the system to function without the addition of any oil or fat except the quantity needed for start-up purposes, but also without the possibility of generating any net oil product. Pressing to a level higher than the break even level, that is, a level at which there is more residual oil in the pressed organic waste solids than there was oil originally associated with these solids in the material flowing into the system through line 1, will not only eliminate the possibility of a net oil product, but also require that the system be supplied continuously with oil or fat for make-up purposes.

The other stream of material leaving press 37, a stream of pressed dry organic waste solids, is withdrawn along metering screw conveyor 50. The solids are fed through an air elimination rotary lock valve 51 into a rotating pyrolizing unit 52 operating internally at a temperature range of 700° F. to 1000° F. It is maintained at this temperature by indirect heating in combustion chamber 53 mounted on the outside of the pyrolizer unit 52. The rotating action of the pyrolizer unit 52 slowly moves the dry organic waste solids toward the discharge end of this unit at the same time the solids are being heated on the surface of the pyrolizer. By maintaining the speed of rotation, product temperature and pitch of the internal conveyor of the pyrolizer unit, the horizontal movement of the solids is directed towards the discharge end of the pryolizer unit. During this period of time and temperature the maximum amount of organic matter is either thermally distilled and/or thermally destructively distilled from the input feed of the pyrolizer. The residual char and inorganic ash are metered out of the pyrolizer through metering conveyor 54, which is designed to also act as an air lock. Often times before leaving the residue is cooled either by water spray heads, or air by having a section of the pyrolizer 52 unheated.

The pyrolysis apparatus employed in this invention may by the rotary Kiln type, with indirect heating as described, or the rotary hearth type where the material is moved through essentially a full circle on a rotating ceramic hearth and subjected to the radiant heat of a combustion flame at from about 1000° F. to 1800° F. Since the combustion gases mix with the fuel gases, the heat can be recovered in the boiler-furnace. Many different types of pyrolysis apparatus can be utilized in the process described. Often the steam-air mixture, used to burn the fixed carbon normally found in the char, can be applied in the same apparatus such as the rotary hearth to thereby effect great fuel efficiency with minimum added capital expenditure.

In order to maintain the operating temperature of the pyrolizer, heat is supplied indirectly through the use of air or oxygen inlet 55 and fuel inlet 56. The feed rates and ratios of each component are monitored along with the pyrolizing temperature to assure effective pyrolization of the material. The cooled combustion exhaust gases formed during the heating of the pyrolizer unit 52 leave through chimney 57, which heat can be recovered in the air preheater of the boiler or the heat may be recovered directly in the boiler furnace.

The moisture content of the material subject to pyrolysis should be at a minimum, but in certain cases where the dehydrated material may undergo certain reactions where water is required, it may be desirable to pyrolize the material in the range of upwards to 30% water without further dehydration prior to pyrolysis.

The vaporized and gaseous fuel of pyrolization and/or thermal distillation are conducted out of the pyrolizer unit through vapor duct 58 and are combusted by being combined with air or oxygen in boiler-furnace 11 which is otherwise supplied with fuel through line 48.

Standard safeguards are provided to prevent oxygen from flowing back into the pyrolization unit 52 causing loss of fuel.

The conversion of fuel in the boiler-furnace 11 produces steam used to supply the energy for the dehydration process in evaporator 9 and is transferred to the evaporator 9 from the boiler 11 by line 10. Any furnace ash is removed through line 49.

Alternatively, if the type or condition of the material permits, the organic waste solids may be removed directly from centrifuge 28 through the metering screw conveyor 50 into the pyrolizing unit 52. This alternative procedure eliminates the necessity of press 37, a situation which may occur if it is not desired to remove the oil in a liquid state.

If desired a two-stage pyrolysis process may be used. In this alternative embodiment shown in FIG. 2, the fluidizing, evaporating, centrifuging and pressing portion of the process are the same. Further, parts identical to the parts shown in FIG. 1 are numbered identically. In the process of FIG. 2, pressed dry organic solids flow from press 37 and are fed to metering screw conveyor 50. Air elimination metering rotary valve 51 feeds solids into the rotating pyrolizer unit 52 which is being indirectly heated by combustion in chamber 53 through the introduction of air or oxygen by inlet 55 and fuel by inlet 56. The temperature in the first stage pyrolizer unit 52 is maintained at a temperature of 350° F. to 600° F. The cooled combustion gases of this indirect heat are removed through chimney 57. The thermally distilled, fluidizing oil is conducted away from the pyrolizer 52 through vapor line 70. The vaporized oil used as the fluidizing oil in the oil-dehydration process, is passed through surface condenser 71 where it is condensed by cooling water entering through line 72 and leaving through line 73. The condensed oil drains through line 74 to holding tank 75. Gaseous products that are not condensed in surface condenser 71 are removed by unidirectional flow line 78 and are used for fuel energy, for example, in the second stage pyrolizer 83 or in boiler-furnace 11. Holding tank 75 acts as an intermediate tank in the recycling of the condensed oil. When make up, fluidizing oil is needed in the oil fluidizing, dehydration process, oil is removed from holding tank 75 through line 76 and, aided by pump 77, is conveyed back into the oil dehydration process.

The deoiled solids leaving the first stage pyrolizer unit 52 are discharged through metering valve 80 to conveyor 81 and metering feed valve 82 to the second stage pyrolizer unit 83 which also is heated indirectly by combustion chamber 84 whose fuel for combustion is supplied by line 86 and combustion air line 85. The cooled combustion gases are exhausted from the combustion chamber by chimney 89. The temperature of pyrolization inside pyrolizer unit 83 is maintained at a temperature of 800° F. to 1200° F. and upon completion of pyrolization the char and ash are removed from pyrolizer unit 83 through metering valve 87 and air sealing conveyor 88.

The organic gases and vapors produced by the pryolysis process are removed from pyrolizer unit 83 through vapor duct 93. They are combined with the noncondensing gases from the first stage pyrolizer in line 96 and are fed into boiler-furnace 11 to produce steam energy to run the oil dehydration process.

As shown in FIG. 2, the steam leaves boiler 11 through line 10 to be used in evaporator 9.

Thus by this apparatus and process, an efficient system for treating organic waste material by pyrolysis is disclosed, in which organic vapors and gases removed from the wastes are used as fuel within the system while oils used to maintain the material in a fluidized condition are recyclable within the system, both attributes contributing to an efficient workable process. Additionally, by using pyrolysis char and ash are produced as the ultimate products of the process from the organic waste material fed as an input. Further, because pyrolysis is used to thermally distill or decompose the material, the vapors and quantities of suspended particles released into the air are held to a minimum.

The single-stage evaporator apparatus described herein has been shown for the sake of simplicity. It should be understood, however, that the invention described is not limited to a single-stage or single-effect evaporator and any arrangement suitable for evaporative drying may be employed. Examples of other evaporator apparatus that may be successfully employed are the multi-effect backward or forward flow evaporator arrangements illustrated in United States Pat. No. Re. 26,317 and U. S. Pat. No. 3,323,575 respectively.

Protection by Letters Patent of this invention in all its aspects as the same are set forth in the appended claims is sought to the broadest extent that the prior art allows.

We claim as our invention:

1. An apparatus system for pyrolizing initially water-containing waste solids concentrates, said system comprising (1) a tank for receiving and mixing a stream of waste solids concentrate and a stream of oil, (2) an evaporator operable by heat, (3) a conduit extending from said tank to said evaporator for transferring the mixture of waste solids concentrate and oil from said tank into the evaporating region of said evaporator, (4) a combustion apparatus associated with said evaporator for supplying evaporative heat thereto to produce a substantially anhydrous mixture of waste solids and oil in said evaporator, (5) a pyrolizing apparatus, and (6) means for transferring said anhydrous mixture of waste solids and oil from said evaporator to said pyrolizing apparatus, said pyrolizing apparatus being disposed to receive said waste solids and destructively distill the same into organic vapors and gases and a residue of char and ash.

2. An apparatus system for pyrolizing initially water-containing waste solids concentrates, said system comprising (1) a tank for receiving and mixing a stream of waste solids concentrate and a stream of oil, (2) an evaporator operable by heat, (3) a conduit extending from said tank to said evaporator for transferring the mixture of waste solids concentrate and oil from said tank into the evaporating region of said evaporator, (4) a combustion apparatus associated with said evaporator for supplying evaporative heat thereto to produce a substantially anhydrous mixture of waste solids and oil in said evaporator, (5) apparatus for separating liquid-solid mixtures into their respective liquid and solid components, (6) a conduit extending from said evaporator to said separating apparatus for transferring the substantially anhydrous mixture of waste solids and oil from said evaporator to said separating apparatus in which said anhydrous mixture may be separated into substantially all waste solids and oil, (7) a pyrolizing apparatus and (8) means for transferring separated waste solids from said separating apparatus to said pyrolizing apparatus, said pyrolizing apparatus being disposed to receive said waste solids and destructively distill the same into organic vapors and gases and a residue of char and ash.

3. An apparatus system for pyrolizing initially water-containing waste solids concentrates according to claim 2 in which said combustion apparatus associated with said evaporator comprises (i) a boiler-furnace for the generation of steam and (ii) a conduit extending from said boiler-furnace to said evaporator for passing steam from said boiler-furnace to said evaporator as indirect heating medium.

4. An apparatus system for pyrolizing initially water-containing waste solids concentrates according to claim 2 further comprising condensing apparatus and a conduit extending from said evaporator to said condensing apparatus for passing water driven off as vapor from said mixture of waste solids concentrate and oil in said evaporator from said evaporator to said condensing apparatus to be recondensed to water therein.

5. An apparatus system for pyrolizing initially water-containing waste solids concentrates according to claim 2 further comprising a conduit extending from said separating apparatus to said tank for passing separated liquid oil from said separating apparatus to said tank to be mixed therein with said waste solids concentrate.

6. An apparatus system for pyrolizing initially water-containing waste solids concentrates as in claim 2 further comprising means for transferring vapors and gases from said pyrolizing apparatus to said combustion apparatus wherein said vapors and gases may be used as fuel to provide at least a portion of the evaporative heat required by the evaporator.

7. An apparatus for pyrolizing initially water-containing waste solids concentrates as in claim 2 further comprising a surface condenser, connected to a vapor discharge line from the pyrolizing apparatus, for condensing the vaporized oil formed by the pyrolizing apparatus.

8. An apparatus system for pyrolizing initially water-containing waste solids concentrates, said system comprising (1) a tank for receiving and mixing a stream of waste solids concentrate and a stream of oil, (2) an evaporator operable by heat, (3) a conduit extending from said tank to said evaporator for transferring the mixture of waste solids concentrate and oil from said tank into the evaporating region of said evaporator, (4) a combustion apparatus associated with said evaporator for supplying evaporative heat thereto to produce a substantially anhydrous mixture of waste solids and oil in said evaporator, (5) means for separating liquid-solid mixtures into their respective liquid and solid components, (6) a conduit extending from said evaporator to said separating apparatus for transferring the substantially anhydrous mixture of waste solids and oil from said evaporator to said separating apparatus in which said anhydrous mixture may be separated into substantially all waste solids and oil, (7) a first pyrolizing means, (8) means for transferring separated waste solids from said separating apparatus to said first pyrolizing means, said pyrolizing means being disposed to receive said waste solids and substantially vaporize all the fluidizing oil remaining on the solids, (9) a second pyrolizing means, and (10) means for transferring the solid residue from said first pyrolizing means to said second pyrolizing means, said second pyrolizing means being disposed to vaporize any remaining oil present on the solids and to destructively distill the oil-free organic solids into organic vapors and gases and a residue of char and ash.

9. An apparatus system for pyrolizing initially water-containing waste solids concentrates as in claim 8 further comprising means for transferring the thermally distilled, fluidizing oil from said first pyrolizing means, and means for receiving and condensing fluidizing vapors and associated gases.

10. An apparatus system for pyrolizing initially water-containing waste solids concentrates as in claim 9 further comprising means for storing said condensed fluidizing oil.

11. An apparatus system for pyrolizing initially water-containing waste solids concentrates as in claim 9 further comprising means for removing the organic vapors and gases from the second pyrolizing means and combining said vapors and gases with non-condensed vapors and gases from said first pyrolizing means.

12. A process for pyrolizing initially water-containing waste solids concentrates comprising the steps of (1) mixing a stream of concentrates of combustible waste solids with a stream of a relatively non-volatile oil to obtain a mixture which will remain fluid and pumpable after the removal of the water content therefrom; (2) subjecting the resultant oil-containing mixture to at least one dehydration step by indirectly heated evaporation; (3) withdrawing a substantially anhydrous waste solids and oil slurry, and (4) pyrolizing said slurry to destructively distill it into organic vapor and gases and a residue of char and ash.

13. A process for pyrolizing initially water-containing waste solids concentrates comprising the steps of (1) mixing a stream of concentrates of combustible waste solids with a stream of relatively non-volatile oil to obtain a mixture which will remain fluid and pumpable after the removal of the water content therefrom; (2) subjecting the resultant oil-containing mixture to at least one dehydration step by indirectly heated evaporation; (3) withdrawing a substantially anhdyrous waste solids and oil slurry; (4) substantially separating the oil from the waste solids in said slurry, and (5) pyrolizing said separated waste solids to destructively distill them and adhering residual oil into organic vapor and gases and a residue of char and ash.

14. A process for pyrolizing initially water-containing waste solids concentrates as in claim 13 further comprising the step of combusting the organic vapors and gases from the pyrolizing step to generate at least some of the evaporative heat necessary for use in the dehydration step.

15. A process for pyrolizing initially water-containing waste solids concentrates as in claim 13 further comprising the step of condensing the water driven off as a vapor in the dehydration step.

16. A process for pyrolizing initially water-containing waste solids concentrates as in claim 13 wherein the pyrolizing step is carried out in a temperature range between approximately 800° F. and 1800° F.

17. A process for pyrolizing initially water-containing waste solids concentrates as in claim 13 further comprising the step of condensing the vaporized oil produced during the pyrolizing step.

18. A process for pyrolizing initially water-containing waste solids concentrates as in claim 13 wherein the pryolizing step comprises a first and second step, said first step having an operating temperature in the range between approximately 350° F. and 700° F. for vaporizing substantially all the fluidizing oil remaining on the solids, the solids produced by the first pyrolizing step being pyrolized in a second pyrolizing step having an operating temperature in the range between approximately 700° F. and 2200° F., thereby vaporizing any remaining oil present on the solids and destructively distilling the oil-free organic solids into organic vapors and gases and a residue of char and ash.

19. A process for pyrolizing initially water-containing waste solids concentrates as in claim 18 further comprising the steps of cooling the oil vapors and associated gases evolved in the first pyrolizing step to condense at least a portion thereof to liquid oil, and withdrawing that oil for further use in the process.

20. A process for pyrolizing initially water-containing waste solids concentrates as in claim 18 further comprising the step of combusting organic vapors and gases from the second pyrolizing step to generate at least some of the evaporative heat necessary for use in the dehydration step.

21. A process for pyrolizing initially water-containing waste solids concentrates as in claim 18 further comprising the steps of cooling the oil vapors and associates gases evolved in the first pyrolizing step to condense at least a portion thereof to liquid oil; withdrawing that oil for further use in the process; mixing any non-condensed vapors and gases evolved in the first pyrolizing step with organic vapors and gases from the second pyrolizing step, and combusting the resulting mixture of vapors and gases to generate at least some of the evaporative heat necessary for use in the dehydration step.

22. A process for pyrolizing concentrated water-containing organic material and salts including sodium chloride and sodium sulfate comprising the steps of (1) mixing said material with a stream of relatively non-volatile oil; (2) dehydrating by indirectly heated evaporation the resultant mixture to obtain a substantially anhydrous slurry of salts and organic dye material suspended in oil; (3) centrifuging the substantially anhydrous solids from the oil, and (4) pyrolizing the solids so obtained to destructively distill them into organic vapor and gases and a char and inorganic salt residue.

23. A process for pyrolizing wet filter aids containing organic material, said process comprising the steps of (1) mixing a stream of wet filter aids with a stream of relatively non-volatile oil; (2) subjecting the resultant oil-containing mixture to at least one dehydration step by indirectly heated evaporation to obtain a substantially anhydrous mixture of oil and filter aid solids; (3) substantially separating the oil from said substantially anhydrous mixture, and (4) pyrolizing the remaining solids to produce inorganic vapor and gases and a residue of char and inorganic filter aid material.

24. A process for pyrolizing wet filter aids containing organic material as in claim 23 in which the pyrolysis is carried out at a temperature below the fusion point of the filter aid to produce a mixture of char and inorganic filter aid material.

25. A process for pyrolizing black liquor from the Kraft Pulp process wherein the liquor contains lignins and salts comprising the steps of (1) mixing a stream of black liquor with a stream of relatively non-volatile oil; (2) subjecting the resultant oil-containing mixture to at least one dehydration step by indirectly heated evaporation; (3) centrifuging the resulting anhydrous slurry to subtantially remove the oil from the black liquor solids, and (4) pyrolizing said solids to destructively distill them into organic vapor and gases and a residue of salts and char.

26. A process for pyrolizing solids from a sewage sludge concentrate comprising the steps of (1) mixing a stream of sewage sludge with a stream of relatively non-volatile oil; (2) subjecting the resultant oil-containing mixture to at least one dehydration step by indirectly heated evaporation to obtain subtantially anhydrous slurry; (3) centrifuging the resulting substantially anhydrous slurry to substantially remove the oil from the sewage solids; and (4) pyrolizing said solids to destructively distill them into organic vapor and gases and a residue of char and ash.

* * * * *